UNITED STATES PATENT OFFICE.

BERNARD OVERLACK, OF BOSTON, MASSACHUSETTS.

NON-CONDUCTIVE AND ELASTIC WATER-PROOF COMPOSITION FOR PIPE-JOINTS, &c.

SPECIFICATION forming part of Letters Patent No. 406,949, dated July 16, 1889.

Application filed May 1, 1889. Serial No. 309,202. (No specimens.)

*To all whom it may concern:*

Be it known that I, BERNARD OVERLACK, of Boston, in the county of Suffolk, State of Massachusetts, have invented a certain new and useful Improvement in Non-Conductive and Elastic Water-Proof Composition for Pipe-Joints, &c., of which the following is a description sufficiently full, clear, and exact to enable any person skilled in the art or science to which said invention appertains to make and use the same, reference being had to the accompanying drawings, forming part of this specification, in which—

My invention relates to a composition of matter for forming pipe-joints, &c., and rendering articles water-proof, impervious to heat and cold, rust, rot, and decay; and it consists in a novel combination of ingredients, hereinafter fully set forth and claimed, the object being to produce a simple, cheap, and effective composition of this character.

The nature of the improvement will be readily understood by all conversant with such matters from the following explanation:

My composition consists of the following ingredients, compounded substantially in the proportions specified in the following formula: Silicious sand, four hundred parts; resin, seventy-five parts; bolted whiting, (commercial,) forty parts, mixed with ten parts cement, fifty parts; ground glass, ten parts; oxide of iron mixed with suboxide of copper, three parts; linseed-oil, (raw,) two parts. These ingredients are thoroughly mixed and boiled with one part of sulphuric acid. The composition thus formed and allowed to cool and harden is found to withstand a temperature of 300° Fahrenheit, and has a crushing-resistance of over four thousand pounds to a square inch.

The composition is applied in a hot liquid form, and is absolutely water-proof. It is thus especially applicable for use as a mortar for lining tanks, reservoirs, &c., as it renders them water-tight, and its elasticity prevents it from being cracked or broken by the contraction or expansion of the material to which it is applied.

Iron or wood dipped in the molten mass and allowed to stand a few moments has its pores opened by the heat, and the composition immediately penetrates and fills them. The iron thus receives a coating which renders it rust-proof. The sap is driven from the wood and evaporated, and as the composition hardens in the pores thereof it is greatly strengthened thereby and made water-proof, rendering it desirable for use in railway-ties, bridge-timbers, &c.

Wood thus prepared and used for piles, ship-timbers, and similar purposes, where it is subjected to the action of the water, is found to absolutely resist the attacks of wood-destroying worms or animalcula.

The enormous strength of the composition and its insulating or non-conductive and water-proof properties are essentially of importance in constructing conduits for electric wires.

It will be seen that in jointing metallic piping the composition can readily be substituted for lead with the additional advantage of forming a solid joint by penetrating the pores of the metal, as above described. Moreover, its elasticity permits a considerable lateral movement of the pipes without breaking or causing the joints to leak, they being found to withstand six times greater pressure than when lead or similar material is employed.

The composition may readily be applied to glass and similar substances, its great adhesive qualities uniting it firmly thereto.

I do not confine myself strictly to the proportions set forth in the formula, as they may be varied considerably without practically affecting the utility of the compound.

Having thus explained my invention, what I claim is—

An elastic water-proof insulating material, consisting of silicious sand, resin, bolted whiting, cement, ground glass, oxide of iron, suboxide of copper, raw linseed-oil, and sulphuric acid, compounded substantially in the manner and proportions specified.

BERNARD OVERLACK.

Witnesses:
  O. M. SHAW,
  K. DURFEE.